United States Patent
Leighton

(10) Patent No.: US 7,329,217 B2
(45) Date of Patent: Feb. 12, 2008

(54) APPLICATION OF ZIPPERS TO FILM MATERIAL

(75) Inventor: Murray Edward Bruce Leighton, Yorkshire (GB)

(73) Assignee: Illinois Tool Works Inc., Glenview, IL (US)

( * ) Notice: Subject to any disclaimer, the term of this patent is extended or adjusted under 35 U.S.C. 154(b) by 199 days.

(21) Appl. No.: 10/515,114

(22) PCT Filed: May 20, 2003

(86) PCT No.: PCT/GB03/02158

§ 371 (c)(1),
(2), (4) Date: Apr. 14, 2005

(87) PCT Pub. No.: WO03/097341

PCT Pub. Date: Nov. 27, 2003

(65) Prior Publication Data

US 2006/0046918 A1    Mar. 2, 2006

(30) Foreign Application Priority Data

May 21, 2002  (GB)  ............................ 0211573.1

(51) Int. Cl.
*B31B 1/90* (2006.01)

(52) U.S. Cl. .................. 493/212; 493/213; 493/927; 53/133.4; 24/64

(58) Field of Classification Search ............. 53/412, 53/133, 4, 139.2; 493/212, 213, 214, 927; 383/5, 63, 61.3, 203, 204, 207; 156/66; 24/64
See application file for complete search history.

(56) References Cited

U.S. PATENT DOCUMENTS

| | | | |
|---|---|---|---|
| 3,692,608 A | 9/1972 | Risgaard | 156/282 |
| 4,655,862 A | 4/1987 | Christoff et al. | 156/66 |
| 4,979,933 A | 12/1990 | Runge | 493/215 |
| 5,102,485 A | 4/1992 | Keeler et al. | 156/256 |
| 5,776,045 A * | 7/1998 | Bodolay et al. | 493/215 |

FOREIGN PATENT DOCUMENTS

| | | |
|---|---|---|
| DE | 1 230 299 | 12/1966 |
| GB | 1 011 722 | 12/1965 |
| GB | 2 349 603 A | 11/2000 |
| WO | WO 00/50226 | 8/2000 |

* cited by examiner

*Primary Examiner*—Hemant M. Desai
(74) *Attorney, Agent, or Firm*—Woodcock Washburn LLP

(57) ABSTRACT

The apparatus applies a transverse zipper strip to a film (10) moving continuously in a direction (12). A continuous belt (18) is driven by sprocket wheels (16a, 16b) and carries upper seal bars (22a, 22b, 22c) which receive pre-cut lengths of zipper at station (3). The pre-cut lengths are attached to the film (10) by a lower seal bar (24) which moves towards the film (12) at position A when an upper seal bar carrying a zipper strip is located directly above the film. Sealing takes place as the upper and lower seal bars move at the same speed as the film (12) from position A to position B where the zipper is released from the upper seal bar (22c). The process then repeats for the next zipper strip length.

9 Claims, 1 Drawing Sheet

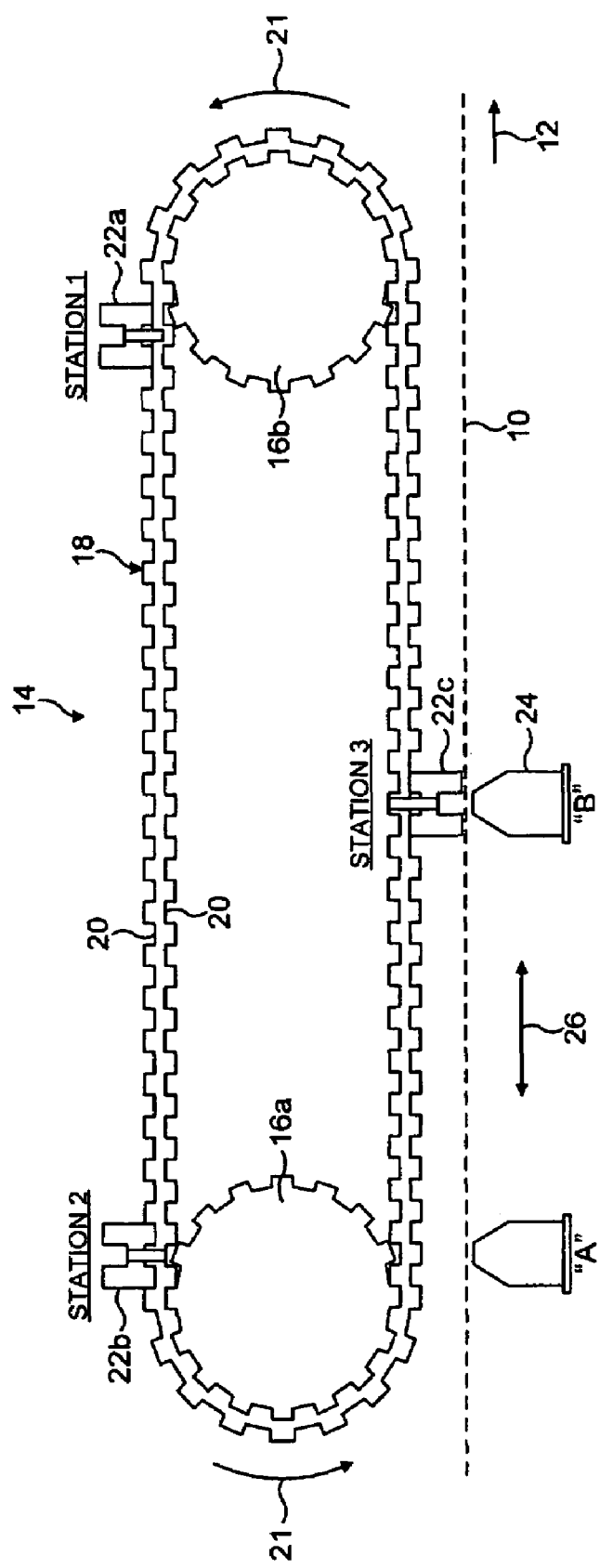

APPLICATION OF ZIPPERS TO FILM MATERIAL

CROSS REFERENCE TO RELATED APPLICATIONS

This is the national phase in the U.S. of International Patent Application PCT/GB2003/02158, filed May 20, 2003, which claims priority to United Kingdom Patent Application 0211573.1, filed May 21, 2002; each of which is incorporated herein by reference.

FIELD OF THE INVENTION

This invention relates to methods of and apparatus for applying recloseable fastener profiles, otherwise known as zippers, to film material, where the zipper is applied transversely to the direction of movement of the film material.

Transverse web or cross-web technology is now well known, where a zipper is applied transversely to the longitudinal axis of a film, but by its very nature the inclusion of means to stop the film and apply the zipper makes a continuously operating unit inefficient.

It is therefore an object of the present invention to provide a method of and apparatus for applying the zipper while the film material or web is still moving at the normal line rate, thus maintaining the efficiency of the line operation.

The method and apparatus of the present invention are applicable both to continuously operating horizontal units and machines and to continuously operating vertical units and machines.

Broadly in accordance with one aspect of the invention there is provided a method of applying a zipper strip to a film transversely to the direction of movement of the film, which comprises moving the film continuously at constant speed, presenting the zipper strip to the film at a first location, arranging for sealing means to begin sealing of the strip to the film at said first location, and moving the sealing means with the zipper strip at the same speed as the film to a second location at which sealing has been completed.

Conveniently, the zipper strip is presented to the film at the first location by a first one of a plurality of applicators and at least one successive zipper strip is presented at the same location by a respective one of the remainder of the plurality of applicators.

Advantageously, the plurality of applicators are used cyclically. The number of applicators may then be a convenient small number, such as three.

The zipper strips are preferably supplied to the applicators at the second location and are moved to the first location during a respective operating cycle. This need not be the case however and the zipper strips may be supplied to the applicators at any point between the second and the first location in the direction of movement of the applicators during an operating cycle.

Broadly in accordance with another aspect of the invention there is provided apparatus for applying a zipper strip to a film transversely to the direction of movement of the film, comprising means for causing the film to move continuously at constant speed, applicator means arranged to receive the zipper strip, to present it to the film at a first location and to advance the strip downstream at the same speed as the film, and sealing means arranged to move downstream at the same speed as the film to effect sealing of the strip to the film between said first location and a second location downstream from said first location.

Preferably, the applicator means comprises a continuous band arranged in proximity to the film, which carries a plurality of strip-receiving units and which is intermittently movable to present the strips to the film in timed relationship to the movement of the film.

Advantageously, the continuous band is internally slotted and is in engagement thereby with sprockets on a rotatable drive means for the continuous band.

Conveniently, the continuous band is externally slotted to receive therein the plurality of strip-receiving units.

Preferably, on the side of the film opposite to the applicator means there is a sealing unit which is reciprocable between an upstream location and a downstream location, which is movable into contact with the film at the upstream location in alignment with a zipper strip, and which travels to the downstream location at the same speed as the film and in contact with the film.

DETAILED DESCRIPTION OF THE INVENTION

One presently preferred embodiment of continuous cross web applicator in accordance with the invention will now be described by way of example and with reference to the accompanying drawing which is a schematic illustration of the applicator.

In the drawing, a continuously moving web or film material is indicated by the broken line 10 and, as indicated by arrow 12, moves from left to right in the drawing. The applicator which is indicated generally at 14 comprises a pair of rotatable driving wheels 16a, 16b which provide a driving motion for a continuous band, chain or belt 18 which, as indicated by arrows 21, travels in the anticlockwise direction, so that the lower run of the band 18 travels in the same direction as the film material 12 and parallel to it. The band 18 is provided with a regular array of slots 20 on both its inside and outside surfaces. The inner slots engage with sprockets on the drive wheels 16a, 16b. The outer slots enable the band to carry a plurality of upper seal bars, three of which are shown at 22a, 22b and 22c in the applicator illustrated in the drawing. The three upper seal bars shown in the drawing are equispaced around the periphery of the band 18. Upper seal bar 22a is positioned at station 1; upper seal bar 22b is positioned at station 2; upper seal bar 22c is positioned at station 3. Each of the upper seal bars is arranged to receive and hold a length of zipper which is to be applied to the film material 12.

Positioned below the film material 12 is a single lower seal bar 24 which is movable in a reciprocating manner as indicated by arrow 26 between a position A and a position B. In the illustrated embodiment, the positions A and B are spaced by a distance which is approximately equal to half the length of the lower run of the band 18.

In operation, the zipper, customarily cut from a length of zipper material, is supplied to the upper seal bar 22c at station 3. At this time the lower seal bar 24 is at position A. Upper seal bar 22c is then moved by the band 18 through station 1 to station 2 where it dwells. As it dwells here, upper seal bar 22a will be receiving the next zipper at station 3. The upper seal bar which is positioned at station 2 waits there for the correct position of the film material 12 to apply the zipper to the film. In a correctly timed relationship the upper seal bar at station 2 moves down into proximity to the film material 12 and moves forward at the same speed as that of the film. At the same time the lower seal bar 24 moves up at position A to begin the sealing of the film 12 to the zipper and travels at the same speed as the film to position B where the sealing has been completed and the zipper has been sealed to the film. The lower seal bar 24 is then lowered at position B and returns to position A where it waits for the next application point. One thus has a continuously moving film 12 and an intermittently moving band 18.

The invention claimed is:

1. Apparatus for applying a zipper strip to a film transversely to the direction of movement of the film, comprising:
   means for causing the film to move continuously at constant speed;
   applicator means for applying the zipper strip to the film at a first location and for advancing the zipper strip downstream at the same speed as the film;
   means for feeding the zipper strip longitudinally to the applicator means; and
   sealing means arranged to move downstream at the same speed as the film for sealing the zipper strip to the film between said first location and a second location downstream from said first location.

2. The apparatus according to claim 1, in which, on the side of the film opposite to the applicator means, there is a sealing unit which is reciprocable between an upstream location and a downstream location, which is movable into contact with the film at the upstream location in alignment with the zipper strip, and which travels to the downstream location at the same speed as the film and in contact with the film.

3. The apparatus according to claim 2, in which the applicator means comprises a continuous band arranged in proximity to the film and a plurality of strip-receiving units to receive and hold the zipper strips, the strip-receiving units being carried by the continuous band which is intermittently movable to present the zipper strips to the film in timed relationship to the movement of the film.

4. The apparatus according to claim 3, in which the continuous band is internally slotted and is in engagement thereby with sprockets on a rotatable drive means for the continuous band.

5. The apparatus according to claim 4, in which the continuous band is externally slotted to receive therein the plurality of strip-receiving units.

6. A method of applying a zipper strip to a film transversely to the direction of movement of the film, the method comprising steps of:
   moving the film continuously at constant speed;
   providing an applicator means for applying the zipper strip to the film at a first location;
   feeding the zipper strip longitudinally to the applicator means;
   providing sealing means and arranging said sealing means to begin sealing of the zipper strip to the film at said first location, and moving the sealing means with the zipper strip at the same speed as the film to a second location downstream from said first location, at which sealing has been completed.

7. The method according to claim 6, in which the applicator means comprises a plurality of strip-receiving units and the zipper strip is presented to the film at the first location by a first one of the plurality of strip-receiving units and at least one successive zipper strip is presented at the same location by a respective one of the remainder of the plurality of strip-receiving units.

8. The method according to claim 7, in which the plurality of strip-receiving units are used cyclically.

9. The method according to claim 8, in which the zipper strips are supplied to the strip-receiving units at the second location and are moved to the first location during a respective operating cycle.

* * * * *